United States Patent Office 3,595,900
Patented July 27, 1971

3,595,900
CYANATOPHENYL-TERMINATED POLYARYLENE ETHERS
Basil L. Loudas, St. Paul, and Herward A. Vogel, Oakdale, Minn., assignors to Minnesota Mining and Manufacturing Company, St. Paul, Minn.
No Drawing. Filed July 1, 1968, Ser. No. 741,303
Int. Cl. C07c *135/00;* C07d *55/08*
U.S. Cl. 260—453                                                8 Claims

ABSTRACT OF THE DISCLOSURE

Hydroxy-terminated polyarylene ethers are reacted with cyanogen halides to produce cyanatophenyl-terminated polyarylene ethers which can be thermally polymerized to produce polyarylene ether cyanurates having outstanding strength, toughness, and flexibility and useful in adhesives, coatings, and binders.

FIELD OF THE INVENTION

This invention relates to cyanato-terminated polyarylene ethers, such as polyphenylene ethers, and to a method for their preparation. In another aspect it relates to polyarylene ether cyanurate polymers of said cyanates and to a method for the preparation of said polymers. In a further aspect it relates to shaped articles made from said cyanurate polymers.

PRIOR ART

Prior art disclosing cyanato-terminated polyarylene ethers and cyanurate polymers thereof is German Pats. 1,190,184 and 1,195,764. The cyanates disclosed there have only two phenylene nuclei linked by a single ethereal oxygen atom, and the resulting cyanurates thereof consist of a plurality of cyanurate rings linked by a diphenylene ether linkage. Though these cyanurate polymers have some desirable properties, their strength and toughness, as well as flexibility, are somewhat limited, thus restricting these polymers to applications where such properties are not required. Further, their thermal stability is not as high as desired. These prior art cyanates generally have relatively high volatility at cure temperatures (because of their relatively low molecular weight) and therefore are relatively toxic and inconvenient to handle. Also, they tend to exhibit runaway reaction during cure since the cyanate groups are present as a relatively large portion of the overall cyanate molecule.

BRIEF SUMMARY OF THE INVENTION

Briefly, in one aspect of this invention, a novel class of cyanatophenyl-terminated polyarylene ethers are provided, the members of which have at least 3 aromatic nuclei (including those in the cyanatophenyl-terminal groups) linearly linked together by ethereal oxygen atoms. These dicyanates, in another aspect of this invention, are prepared by reacting respective hydroxy-terminated polyarylene ethers with cyanogen halide in the presence of a base, such as triethylamine. In another aspect of this invention, said cyanates are thermally polymerized to form polyarylene ether cyanurate polymers with the cyanurate rings thereof being linked by at least 3 aromatic nuclei which in turn are linked by ethereal oxygen atoms, said polymers being capable of being readily fabricated in the form of shaped articles having improved flexibility and outstanding strength and toughness.

DETAILED DESCRIPTION OF THE INVENTION

The cyanatophenyl-terminated polyarylene ethers of this invention, briefly described above, preferably have the formula $$NCO-R-OCN \quad (I)$$

where R is a divalent radical having at least 3, and as many as 15 or more, aromatic nuclei linearly linked together with ethereal oxygen atoms, such as those nuclei selected from the group consisting of phenylene, diphenylene, and radicals of diphenyl ether, 2,2-diphenylpropane, benzophenone, and diphenylsulfone. These aromatic nuclei have structures shown as follows:

TABLE I

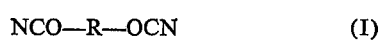

Representative cyanatophenyl-terminated polyarylene ethers coming within the scope of general Formula I, and preferred members of same, include those shown in Table II.

TABLE II

| Dicyanate | Melting point, °C. |
|---|---|
| NCO—⟨⟩—O—⟨⟩—O—⟨⟩—OCN | 133–135 |
| NCO—⟨⟩—O—⟨⟩—O—⟨⟩—O—⟨⟩—OCN | 110–115 |
| NCO—⟨⟩—O—⟨⟩—O—⟨⟩—O—⟨⟩—OCN | 98–100 |
| NCO—⟨⟩—O—⟨⟩—O—⟨⟩—OCN | 120 |
| NCO—⟨⟩—O—(⟨⟩—O—)$_{n\sim10}$⟨⟩—OCN | 100 |

TABLE II—Continued

| Dicyanate | Melting point, °C. |
|---|---|
| NCO—⌬—C(CH₃)₂—⌬—O—(⌬—O)ₙ~₁₀—⌬—OCN | 100 |
| NCO—⌬—O—⌬—CO—⌬—O—⌬—OCN | 139–140 |
| NCO—⌬—O—⌬—S(O)—⌬—O—⌬—OCN | ~70 |
| NCO—⌬—O—⌬—SO₂—⌬—O—⌬—SO₂—⌬—O—⌬—OCN | ~120 |

The dicyanates of this invention can be prepared by reacting the dihydroxy polyarylene ether precursors with cyanogen halide in the presence of a base, such as triethylamine. U.S. Pat. 3,219,670 is representative of art which discloses such hydroxy precursors. Cyanation of these hydroxy precursors, according to this invention, is generally carried out by reacting the hydroxy precursors with a stoichiometric amount of cyanogen halide. Because of the exothermic nature of the reaction and the desire to prevent side reactions, and because of the volatility of the cyanogen halide, low temperatures below the boiling points of the reactants are maintained during cyanation. Generally, low temperatures in the range of —40 to 40° C., preferably —20 to 0° C. will be used and the reaction carried out in an inert liquid organic solvent. Solvents useful for this purpose representatively include acetone, ether, tetrahydrofuran, aromatic hydrocarbons such as benzene, toluene, and xylene, and halogenated aliphatic or aromatic hydrocarbons. The cyanation reaction is carried out in the presence of a base such as tertiary amines like triethylamine or an alkyl metal hydroxide such as sodium hydroxide, the amount of base used being sufficient to neutralize the hydrogen halide produced in the reaction (see German Pat. 1,190,184). It is preferred to adjust the addition rate of the base during the cyanation process such that always an excess of cyanogen halide over the base is present.

Cyanogen halides which can be used include cyanogen chloride (the preferred cyanating agent) and cyanogen bromide, these cyanating agents being well-known compounds which are commercially available or which can be prepared by well-known methods. Stoichiometrically, one mole of cyanogen halide is reacted with one equivalent of a hydroxyl group in the hydroxy polyarylene ether reactant; however, we prefer to use an amount in excess of stoichiometric e.g., cyanogen halide up to 10% excess.

After cyanation is completed, the cyanate product can be recovered from the reaction mixture by any suitable recovery procedure, such as precipitation, extraction, distillation, crystallization, etc. Preferably, the product is recovered by mixing the reaction mixture with a water-immiscible liquid organic solvent in which the cyanate is soluble, such as methylene chloride, chloroform or benzene. The resulting solvent mixture is then poured into ice water. The non-aqueous phase containing the cyanate is separated from the aqueous phase containing the neutralized halide, for example, by decanting, and can be dried, for example, over anhydrous magnesium sulfate, and filtered. The solvent can then be removed from cyanate by stripping, for example, under vacuum at room temperature.

We have found that above-described cyanates are particularly useful as monomers, intermediates, or prepolymers for the prepartion of cyanurate polymers. Polymerization of the cyanates is accomplished by heating the cyanates to effect their thermal polymerization. Homopolymers of the cyanates as well as copolymers of two or more of said cyanates can be prepared in this fashion.

The thermal polymerization of the cyanates, in accordance with this invention, involves trimerization of terminal cyanato groups to form a cyanurate that has a three-dimensional network structure with polyarylene ether linkages between cyanurate rings, the polymerization being illustrated as follows:

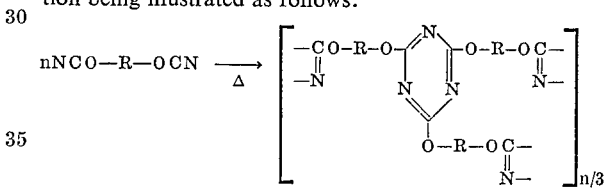

where $n$ is a multiple of 3 and can be as large as the number of molecules of dicyanate employed, and R is as defined in Formula II above.

Generally, the polymerization or curing of cyanates, in accordance with this invention, will be carried out by first melting the cyanate monomeric material to obtain a homogeneous melt and then raising the temperature in a range of 50 to 200° C., preferably 100 to 150° C. Alternatively, this polymerization can be carried out at lower temperatures, preferably 25 to 100° C., with the aid of activators, initiators or catalysts. These polymerization promoting agents representatively include Lewis acids, such as aluminum chloride, boron trifluoride, ferric chloride, titanium chloride, and zinc chloride; protonic acids, such as hydrochloric and other mineral acids; salts of weak acids, such as sodium acetate, sodium cyanide, sodium cyanate, potassium thiocyanate, sodium bicarbonate, sodium boronate, and phenylmercuric acetate; and bases, such as sodium methoxide, sodium hydroxide, pyridine, triethylamine, and the like. Preferred catalysts are non-ionic coordination compounds, such as cobalt, iron, zinc, and copper acetyl acetonates. The amount of catalyst used can vary, and generally will be 0.05 to 5 mole percent, preferably 0.05 to 0.5 mole percent.

The polymerization of the cyanates can also be carried out by polymerizing them in solution or in suspension, using as a solvent or suspension medium the common organic solvents such as hydrocarbons, ketones, halogenated hydrocarbons, nitrated hydrocarbons, dimethylsulfoxide, dimethylformamide or ether. The solvent can be removed by distillation or simple evaporation during the course of or at the end of the polymerization.

The cyanatophenyl-terminated polyarylene ethers of this invention are crystalline or amorphous solids which melt to flowable liquids at convenient working temperatures. They are soluble in a variety of organic solvents such as methylene chloride, chloroform, benzene, toluene, chlorobenzene, acetone, methyl ethyl ketone, ethylbenzoate, ethylcellulose, dimethylformamide, etc. They provide excellent bases for solvent-diluted coatings such as brush, spray, and dip coatings, particularly in the case of the higher molecular weight prepolymer type of dicyanates. The cyanatophenyl-terminated polyarylene ethers can be used as one-component cured-in-place resins which show good thermal stability along with resistance to solvents and corrosive chemicals such as dilute acids and basis. The fabrications of shaped articles from these cyanurate resins is greatly facilitated in that no volatile by-products are liberated during the curing process.

The cyanatophenyl-terminated ethers of this invention have relatively high molecular weight and consequently have low volatility and therefore less toxicity and can be conveniently handled at elevated temperatures. Also, reactions involving these cyanates can be controlled readily, in spite of exothermic heat generated, since the active cyanato groups constitute in part a small portion of the overall compound. The cyanurate polymers of this invention have improved strength, toughness, and impact resistance and can be used for adhesives, coatings and binders. The crosslinking density in the resin is relatively low because of the larger linear chain segments spaced between cyanurate rings. Resistance to thermal degradation caused by aging at high temperatures is also improved because of a reduced concentration of the relatively less stable cyanurate rings.

It is also within the scope of this invention to copolymerize one or more of said dicyanates with one or more mono or dicyanates of the prior art, such as the aromatic cyanates disclosed in German Pats. 1,190,184 and 1,195,764, Angew Chemie 76, 303 (1964) and Acta Chem. Scand. 18, 826 (1964). Preferred aromatic cyanates useful in this invention for this purpose are those of the general formula:

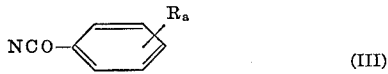

(III)

where $R_a$ is hydrogen, cyanato, or an aromatic nuclei such as that derived from benzene, naphthalene, or biphenyl, which nuclei can have a cyanto group as a ring substituent. The amount of such aromatic cyanate which can be copolymerized with the polyarylene ether cyanates of this invention can vary and generally will be dictated by the particular properties desired to be imparted by them to the cyanurate polymers. For example, the degree of crosslinking of the polymer can be increased in some instances by incorporating such aromatic short chain dicyanates. The heat distortion temperature of the polymer can thereby be increased.

Other cyanates which can be copolymerized with those of this invention are the cyanatomethyl-terminated fluorocarbons disclosed in copending application Ser. No. 741,308, filed concurrently herewith and incorporated herein by reference. These cyanates can be represented by the general formula:

$$F_3C(CFX)_mA(CFX)_mCH_2OCN \quad (IV)$$

where A is a carbon-to-carbon bond or $$-O(CFX-CF_2-O)_m;$$

and dicyanates of the general formula:

$$NCOCH_2(CFX)_mB(CFX)_mCH_2OCH \quad (V)$$

where B is either: a carbon-to-carbon bond; or one or more ether-linked $(CFX)_m$ groups; or two $$(O-CF_2-CFX)_m$$

groups linked by $-O(CFX)_m$ or one or more blocks of $$(CF_2CH_2)_n(CF_2CFX)$$

where, in Formulas IV and V, X is fluorine or a perfluoroalkyl, and $n$ is an integer of 1 or higher.

When the cyanates of general Formulas IV and V are copolymerized with the cyanato-terminated polyarylene ethers of this invention, the resultant copolymers will have improved chemical resistance and thermal stability, such properties being imparted by the fluorocarbon monomeric units incorporated into the polymers.

Cyanurate polymers of this invention can broadly be illustrated by the generic formula:

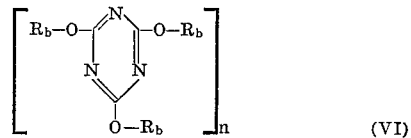

(VI)

where at least one of said $R_b$ groups is $-R-OC=N-$ (where R is as defined in Formula I) and the other $R_b$ groups can be cyanato-free residues of chain-terminating monocyanates or chain-extending linkages of dicyanates of the prior art. For example, said other $R_b$ groups can be selected from the group $$F_3C(CFX)_mA(CFX)_mCH_2-$$

$$-N=COCH_2(CFX)_mB(CFX)_mCH_2-$$

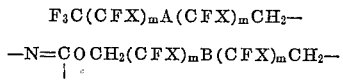

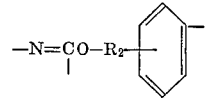

where $R_1$ is hydrogen or an aromatic nuclei (see Formula III), $R_2$ is an oxygen-to-carbon bond or an aromatic nuclei (see Formula III), and where in Formula VI, $n$ is an integer dependent on the functionality of the monomers where a dicyanate is included.

Where a monocyanate is copolymerized with a dicyanate, copolymeric cyanurates are formed in which the network growth and crosslinking density are reduced by the chain-terminating monocyanate monomer, whether the latter is a fluorocarbon monocyanate or an aromatic monocyanate. Generally, where used, the prior art cyanates will amount to 5 to 95 wt. percent, preferably 5 to 50 wt. percent of the cyanurate polymer.

EXAMPLES

The object and advantages of this invention are further illustrated by the following examples, but the particular materials and amounts thereof recited in these examples as well as other conditions and details should not be construed to unduly limit this invention.

EXAMPLE 1

In a 3-neck, 1000 ml. round bottom flask, a mixture of 56 g. of cyanogen bromide (0.53 mole) and 73.5 g. (0.25 mole) of 1,4-bis(p-hydroxyphenoxy)benzene (prepared as described in U.S. Pat. 3,219,670) is dissolved in 300 ml. of cold acetone. The stirred solution is cooled by means of ice water bath and 50.5 g. (0.50 mole) of triethylamine is added at a slow enough rate to maintain the temperature at about 5° to 10° C. After completion of the reaction, the slurry is poured into 2 liters of ice water. The precipitate, 1,4-bis(p-cyanotophenoxy)benzene, is recovered by section filtration, washed with cold methanol and dried at room temperature in a rotary vacuum drier. Yield: 48 g. M.P. 135° C. The dicyanate (designated as composition A) can be cured at 150° C. to firm a cyanurate which is a strong tough plastic. The glass transition temperature. $T_g$, as measured by differential thermal analysis, is 190 to 207° C. Other physical properion are shown in Tables III and IV.

EXAMPLE 2

4,4'-bis(p-cyanatophenoxy)diphenyl ether is prepared from 1,4-bis(p-hydroxyphenoxy)phenol ether (described in U.S. Pat. 3,219,670) by reaction with 2 moles of cyanogen bromide and triethylamine following a similar procedure as outlined in Example 1. The cyanate product (designated as composition B) is obtained as an amorphous powder showing a melting point at about 100° C. The cured cyanurate resin obtained upon heating at 150 to 200° C. for ½ to 1 hr. has a $T_g$ of 160 to 175° C. Other properties are shown in Tables III and IV.

EXAMPLE 3

4,4-bis(m-cyanatophenoxy)diphenyl ether is prepared from the corresponding diol (described in U.S. Pat. 3,219,670) by reaction with 2 moles of cyanogen chloride and triethylamine in acetone solution at −20 to −10° C. following a similar procedure as described in Example 1. The wet precipitate is dissolved in methylene chloride and after drying of the methylene chloride solution with anhydrous magnesium sulfate the product is recovered by evaporation of the solvent. The crystalline cyanite compound (designated as composition C) melts at 98–100° C. Properties of the cured cyanurate resin obtained upon heating at 150 to 200° C. for ½ to 1 hr. are shown in Tables III and IV.

EXAMPLE 4

4,4-bis(cyanatophenoxy)diphenyl sulfone is prepared by starting with the Ullmann condensation of dichlorodiphenyl sulfone and p-methoxyphenol. In a one liter flask heated in an oil bath and provided with mechanical stirrer, nitrogen inlet and outlet, and adapter for downward distillation, are placed 150 g. (1.2 mole) of p-methoxyphenol and 66 g. of 85% pulverized potassium hydroxide. The mixture is heated under a slow stream of nitrogen for about 15 minutes at a temperature of 180° C. to drive off most of the liberated water. Then, 1 g. of cupric oxide catalyst and 144 g. (0.5 mole) of p-dichlorodiphenyl sulfone is added. The temperature is slowly increased to 200° C. and maintained for about one hour. The thick reaction mixture is then diluted with 100 ml. of dimethylformamide and poured into 2 liters of hot water. The 4,4' - bis(p - methoxyphenoxy)diphenyl sulfone is recrystallized from DMF/methanol. Yield 154 g., M.P. 114–116° C.

In a 600 ml. beaker are placed 50 g. of the above methoxyphenoxy compound and 100 g. of pyridine hydrochloride. The mixture is heated on an electrical hot plate to an internal temperature of 210–220° C. while stirring. The mixture is maintained at slight boiling for about 15 minutes until a clear solution is obtained and then poured into 2 liters of water. The separated 4,4'-bis(p-hydroxyphenoxy)diphenyl sulfone is recrystallized from methanol/water. Yield: 42 g., M.P. 188–189° C.

The diol is converted to the dicyanate by reaction with 2 moles of cyanogen bromide and triethylamine following essentially the procedure described in Example 1. The 4,4'-bis(p-cyanatophenoxy)diphenyl sulfone (designated as composition D) is obtained as an amorphous powder melting at about 70° C. The cured cyanurate resin obtained upon heating at 150 to 200° C. for 1 hr. shows a $T_g$ at 160–173° C.

4,4' - disulfonyl(p - cyanatophenoxyphenyl) - diphenyl ether, a higher molecular weight arylenesulfone ether cyanate, is obtained similarly from 4,4'-disulfonyl(p-hydroxyphenoxyphenyl)diphenyl ether. The diol is prepared from 4,4'-diphenyl ether disulfonyl chloride and p-methoxydiphenyl ether by Friedel Crafts condensation and cleavage of the methoxy groups with pyridine hydrochloride.

EXAMPLE 5

4,4'-bis(p-cyanatophenoxy)dibenzophenone.—In a suitable vessel 200 g. of p,p'-dichlorodiphenyl-2,2,2-trichloroethane (DDT) and 0.5 g. of ferric chloride are heated at about 120–140° C. until evolution of hydrogen chloride ceases. The product is then recrystallized from ethanol to give a nearly quantitative yield of p,p'-dichlorodiphenyl 2,2-dichloroethylene, M.P. 88–89° C. The latter compound (130 g.) is oxidized in glacial acetic acid (750 ml.) with chromium trioxide (80 g.) at 80–100° C. The $CrO_3$ is added carefully in portions to avoid excessive foaming. The p,p'-dichlorobenzophenone is isolated by pouring of the reaction mixture in water and trituration of the precipitated product with methanol. Yield: 85 g. M.P. 144° C.

The p,p'-dichlorobenzophenone is reacted with potassium p-methoxy-phenolate at 230° C. following the procedure as described for a similar Ullmann reaction in Example 4. The resulting 4,4'-bis(p-methoxyphenoxy)-benzophenone (M.P. 198–200° C.) is hydrolyzed to the diol by fusion with pyridine hydrochloride for one hour at about 220° C. The 4,4'-bis(p-hydroxyphenoxy)benzophenone after recrystallization from glacial acetic acid melts at 217–219° C.

The diol is converted to the dicyanate by reaction with 2 moles of cyanogen bromide and triethyl amine following essentially the procedure described in Example 1. The 4,4'-bis(p-cyanatophenoxy)benzophenone (designated as composition E) melts at 138–140° C. The cured cyanurate resin obtained after heating at 150–200° C. has a $T_g$ at 175.190° C.

EXAMPLE 6

A hydroxy-terminated copoly(p,o-phenylene oxide) of about 900 molecular weight is prepared from p-chlorophenol, o-chlorophenol and 4,4'-isopropylidenediphenol as follows.

A one-liter, three-neck flask is equipped with a packed column topped by a Dean-Stark azeotrope separator and reflux condenser on the center neck, a nitrogen inlet and thermometer on one side and a dropping funnel with pressure equalizing arm on the other side. A coated magnet (coated with Teflon polytetrafluoroethylene) is placed in the flask, and a magnetic stirrer is placed beneath the heating mantle supporting the flask.

Pyridine (450 ml.), benzene (150 ml.), p-chlorophenol (167.1 g., 1.30 moles), o-chlorophenol (90.0 g., 0.70 mole) and bisphenol-A (45.6 g., 0.20 mole) are weighed into the flask through one of the side necks, and 45% aqueous potassium hydroxide (267.8 g., 2.16 moles) is added to the dropping funnel.

The top of the reflux condenser is attached to a vacuum pump or water aspirator, and the system is flushed several times with nitrogen while the base is allowed to flow into the solution during 5–10 minutes. The system is finally restored to atmospheric pressure with nitrogen, and heat is applied while a slight positive pressure of nitrogen is maintained.

Water is removed by azeotropic distillation via the Dean-Stark trap until no further water separates from the benzene distillate. A heavy slurry of precipitated phenolates is obtained.

The magnetic stirrer and packed column are then removed, a mechanical stirrer is placed in the center neck, and the Dean-Stark trap and reflux condenser are put in the side neck in place of the dropping funnel. Solvent is removed through the Dean-Stark trap until the solution temperature reaches 160° C. A solution of cuprous chloride (.425 g., .004 mole) in pyridine (60 ml.) is added by injection through the rubber tubing of the nitrogen inlet with a hypodermic syringe and the temperature is maintained at 160–170° C. for 3.0 hours. Finally, the temperature is raised to 250° for 2 hours and the reaction is stopped by dilution with 200 ml. of pyridine. After cooling, the mixture is precipitated in water using a blender to disperse the solid polymer.

The slurry is filtered and the solid is washed successively with water, methanol, dilute hydrochloric acid, water and finally methanol before being dried in a vacuum oven at 40° C. The yield is 215 g. The inherent viscosity in 1% chloroform solution is .07. The prepolymer softens at about 80° C. The number average molecular weight by vapor pressure osmometry (VPO) is 900 and the hydroxyl equivalent weight is 536 when determined by the method of Ogg, Porter and Willits, Ind. Eng. Chem., Anal. Ed., 394, June 1945. The hydroxy-terminated prepolymer has the following structure:

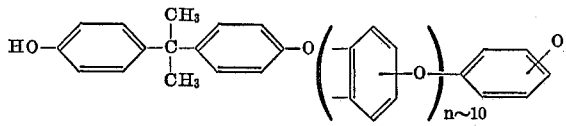

To a solution of 53.5 g. (0.1 mole equivalent) of the dihydroxy prepolymer and 11.5 g. (0.11 mole) of cyanogen bromide in 250 ml. of acetone, is added with stirring 10.1 g. (0.10 mole) of triethylamine. The temperature of the reaction mixture is maintained at about 5° C. by means of an external cooling bath. After completion of the amine addition, the mixture is poured into water. The precipitated sticky product is separated and digested with cold methanol. After filtration, the cyanatophenyl-terminated copoly(p,o-phenylene oxide) (designated as composition F) is obtained as a tan, amorphous powder which softens at about 80° C. The cyanophenyl-terminated prepolymer cures at 150° C. to a tough cyanurate plastic which has a $T_g$ of 104–115° C.

EXAMPLE 7

The dicyanate compounds made as described in Examples 1 to 6 (designated as compositions A through F) are used to adhesively bond one inch wide by 0.063 inch thick aluminum strips for ½ inch overlap by curing at 350° F. for one hour as 25 p.s.i. bond pressure. Shear tests are performed on an Instron test machine according to test method ASTM D–1002. The overlap shear tensile strength in lbs./sq. in. at various temperatures are shown in Table III.

Table IV lists test data on Izod impact strength (ASTM D–256–56A) of the cured compositions A, B, C and E. The samples are prepared by curing 25 g. of the dicyanate compound in a leveled one inch wide by eight inch long cavity mold at 300° F. for about 5 hours and at 500° F. for ½ hr. Each of the approximately ⅛ inch thick bars is cut with a band saw into four ½ by 4 inch test specimens.

TABLE III

| Composition | Overlap shear tensile strengths (p.s.i.) | | | | | |
| --- | --- | --- | --- | --- | --- | --- |
| | −67° F. | 75° F. | 180° F. | 250° F. | 300° F. | 350° F. |
| A | 4,400 | 4,400 | 3,900 | 3,000 | | 1,350 |
| B | 4,000 | 4,000 | 3,500 | 3,500 | 2,000 | 1,000 |
| C | 5,500 | 3,800 | 3,500 | 2,900 | 2,000 | 1,200 |
| D | 1,600 | 1,800 | 1,400 | 1,800 | | 1,300 |
| E | 2,200 | 2,100 | 3,400 | 1,500 | | 400 |
| F | 3,800 | 4,200 | 4,000 | 2,000 | | |

TABLE IV

| Composition: | Impact strengths, ft. lbs. |
| --- | --- |
| A | 1.6 |
| B | 2.0 |
| C | 2.9 |
| E | 3.2 |

The data of Table III show the desirably high tensile strengths, particularly those at room temperature and low temperature when compared with prior art cyanurate polymers, exhibited by the cyanurate polymers of this invention. The data of Table IV show the desirably high impact values exhibited by these polymers, which are considerably better than that for prior art cyanurate polymers, indicating better toughness and flexibility.

Various modifications and alterations of this invention will become apparent to those skilled in the art without departing from the scope and spirit of this invention, and it should be understood that this invention is not to be unduly limited to the illustrative embodiment set forth herein.

We claim:

1. Cyanatophenyl-terminated polyarylene ethers of the formula

NCO—R—OCN where R is a divalent radical having 3 to 15 aromatic nuclei linearly linked together with ethereal oxygen atoms, said nuclei comprising nuclei selected from the group consisting of

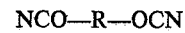

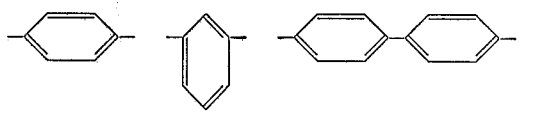

2. A cyanatophenyl-terminated polyarylene ether according to claim 1, where R is

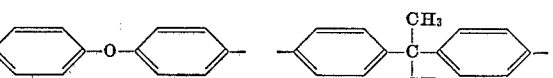

3. A cyanatophenyl-terminated polyarylene ether according to claim 1, where R is

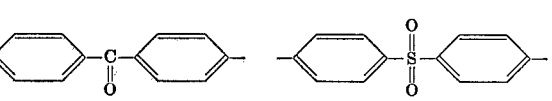

4. A cyanatophenyl-terminated polyarylene ether according to claim 1, where R is

5. A cyanatophenyl-terminated polyarylene ether according to claim 1, where R is

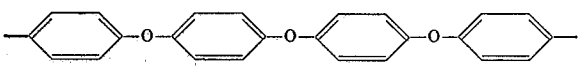

where n is about 10.

6. A cyanatophenyl-terminated polyarylene ether according to claim 1, where R is

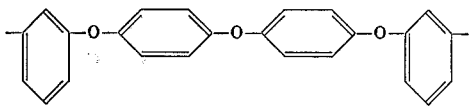

7. A cyanatophenyl-terminated polyarylene ether according to claim 1, where R is

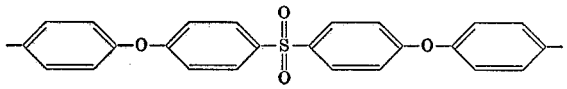

8. A cyanatophenyl-terminated polyarylene ether according to claim 1, where R is
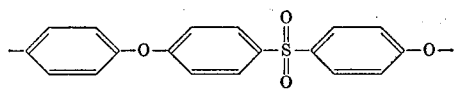
References Cited
FOREIGN PATENTS
1,190,184  4/1965  Germany.
1,195,764  7/1965  Germany.
CHARLES B. PARKER, Primary Examiner
D. H. TORRENCE, Assistant Examiner
U.S. Cl. X.R.
117—132, 161; 260—47, 49, 77.5, 248, 591, 607, 613

UNITED STATES PATENT OFFICE
CERTIFICATE OF CORRECTION

Patent No. 3,595,900               Dated July 27, 1971

Inventor(s) Basil L. Loudas and Herward A. Vogel

It is certified that error appears in the above-identified patent and that said Letters Patent are hereby corrected as shown below:

Column 5, line 65, in formula V, this formula should read

-- $NCOCH_2(CFX)_m B(CFX)_m CH_2 OCN$ --

Column 6, line 72, delete "firm" and substitute therefor

-- form --.

Column 7, line 22, delete "cyanite" and substitute therefor

-- cyanate --.

Signed and sealed this 25th day of January 1972.

(SEAL)
Attest:

EDWARD M. FLETCHER, JR.            ROBERT GOTTSCHALK
Attesting Officer                  Commissioner of Patents